Patented July 20, 1937

2,087,469

UNITED STATES PATENT OFFICE 2,087,469

COATING COMPOSITION

William Chalmers, Vancouver, British Columbia, Canada, assignor, by mesne assignments, to Röhm & Haas Company, Philadelphia, Pa.

No Drawing. Original application September 19, 1935, Serial No. 41,257, which is a continuation of application Serial No. 431,982, February 27, 1930. Divided and this application January 14, 1936, Serial No. 59,067. In Canada January 29, 1930

11 Claims. (Cl. 134—26)

This invention relates to the preparation of polymerization products of derivatives of methacrylic acid such as methacrylic ethyl ester and methacrylic nitrile.

Substances produced by polymerization of methacrylic ethyl ester and methacrylic nitrile may be used as artificial resins, transparent or glass-like resins, or as plastic materials.

The polymerization products of methacrylic ethyl ester are obtained by exposing the methacrylic ethyl ester to the action of heat, sunlight, or ultra-violet light, with or without the use of catalysts, such as sodium, potassium, benzoyl peroxide or other organic or inorganic peroxides. The ester may be in the pure state or in solution in solvents such as benzene.

While the polymerization may be completed by allowing the ester to stand in the dark in a warm place for several weeks, it is preferred to subject the ester to the action of the agents above mentioned in order to accelerate the rate of polymerization so that the polymerization products may be produced on a commercial scale.

The nature of the product resulting from polymerization of methacrylic ester varies from that of an elastic solid to a hard glassy substance, dependent upon the duration or completeness of the polymerization process. The elastic substance thus obtained may be converted into the hard glassy form by distilling off the unchanged monomer at 130° C.

Both forms of the polymerization product thus obtained are soluble in all common organic solvents, except the alcohols in which they are only partially soluble. Solution of the polymer is rather slow and swelling first takes place followed by solution of the swollen mass. The elastic substance or product obtained is simply the glassy form which has been swollen by means of the unchanged monomer and, because of this previous swelling, is more quickly soluble in organic solvents.

These polymerized substances, when allowed to evaporate on a glass, metal or wood surface, form a smooth glassy coating of great durability and are thus particularly suited as a base for lacquers.

The methacrylic nitrile may be polymerized by the application of heat or by allowing the nitrile to stand with alkali metals such as those referred to in connection with the polymerization of the methacrylic ethyl ester.

The monomeric ester or nitrile may be hydrolyzed before polymerization by means of dilute acids or alkalies to give the methacrylic acid which is already known to polymerize to a porcelainlike mass.

In order to more clearly illustrate the manner in which the polymerization process above described may be carried out, the following examples are given:

Example 1.—Methacrylic ethyl ester, to which about one-half of one per cent of benzoyl peroxide has been added, is placed in a suitable quartz or other container and exposed to the radiation from a mercury vapor lamp. The rate of polymerization depends, of course, upon temperature conditions and upon the intensity of the radiation. It has been found that when a small sample of the ester and peroxide is placed in close proximity to a small 110 volt lamp the ester is converted into a glassy solid material in a period of time ranging from one and one-quarter to one and one-half hours.

Example 2.—The methacrylic ethyl ester may be heated in a closed container from sixteen to twenty hours at 130° C. at the end of which time it is converted into the solid polymer. This solid may be dissolved in all of the common organic solvents except the alcohols in which it is only partially soluble.

Example 3.—Methacrylic nitrile is treated by placing therein one per cent of sodium wire and allowing the nitrile to stand for a week, at the end of which time it is entirely converted into a solid resinous mass of a dark brown color. The sodium is destroyed and the dark color removed by the addition of alcohol. The purification may then be completed by washing with water so that the final product is a light colored resinous material.

Example 4.—Polymethacrylic nitrile is dissolved in concentrated hydrochloric acid in which it forms a clear solution. The solution is then diluted with water so that the polymethacrylic acid is precipitated as a white flocky mass which can be filtered and dried.

While in the foregoing description reference has been made solely to the polymerization of methacrylic ethyl ester, it will be understood that the process may also be applied to the polymerization of the butyl ester and other homologues, particularly the esters of methacrylic acid containing up to and including five carbon atoms in the alcohol radical, which esters will hereinafter be referred to as the lower aliphatic esters of methacrylic acid.

This application is a division of my copending application Ser. No. 41,257 filed September 19, 1935, which application is in turn a continuation of my application Ser. No. 431,982 filed February 27, 1930.

I claim:

1. A coating composition comprising a solution of polymerized ethyl α-methacrylate.
2. A coating composition comprising a solution of polymerized butyl α-methacrylate.
3. A coating composition comprising a solution of polymerized α-methacrylic nitrile.
4. A coating composition comprising a solution of a polymerized lower aliphatic ester of α-methacrylic acid.
5. A coating composition comprising a solution of a member of the group consisting of the polymerized lower esters and nitrile of α-methacrylic acid.
6. A coating composition comprising a solution of a polymerized product containing the ethyl ester of α-methacrylic acid in polymerized form.
7. A coating composition comprising a solution of a polymerized product containing the butyl ester of α-methacrylic acid in polymerized form.
8. A coating composition comprising a solution of a polymerized product containing α-methacrylic nitrile in polymerized form.
9. A coating composition comprising a solution of polymerized product containing a lower aliphatic ester of α-methacrylic acid in polymerized form.
10. A coating composition comprising a solution of a polymerized aliphatic ester of α-methacrylic acid.
11. A coating composition containing a polymerized ester of methacrylic acid.

WILLIAM CHALMERS.